United States Patent
Wang et al.

(10) Patent No.: US 10,567,162 B2
(45) Date of Patent: Feb. 18, 2020

(54) MASK S-BOX, BLOCK CIPHERS ALGORITHM DEVICE AND CORRESPONDING CONSTRUCTION PROCESS

(71) Applicant: SHENZHEN STATE MICRO TECHNOLOGY CO LTD, Shenzhen, Guangdong (CN)

(72) Inventors: Liangqing Wang, Guangdong (CN); Songliang Yu, Guangdong (CN); Ruocan Wang, Guangdong (CN)

(73) Assignee: SHENZHEN STATE MICRO TECHNOLOGY CO LTD, Shenzhen, Guangdong (CN)

( * ) Notice: Subject to any disclaimer, the term of this patent is extended or adjusted under 35 U.S.C. 154(b) by 287 days.

(21) Appl. No.: 15/838,979

(22) Filed: Dec. 12, 2017

(65) Prior Publication Data
US 2018/0183576 A1    Jun. 28, 2018

Related U.S. Application Data

(63) Continuation of application No. PCT/CN2016/112940, filed on Dec. 29, 2016.

(30) Foreign Application Priority Data

Dec. 22, 2016 (CN) .......................... 2016 1 1198866

(51) Int. Cl.
*H04L 9/06* (2006.01)
*G06F 21/60* (2013.01)
(Continued)

(52) U.S. Cl.
CPC ............ *H04L 9/0631* (2013.01); *G06F 7/588* (2013.01); *G06F 9/30029* (2013.01); *G09C 1/00* (2013.01);
(Continued)

(58) Field of Classification Search
None
See application file for complete search history.

(56) References Cited

U.S. PATENT DOCUMENTS

2009/0003598 A1*   1/2009   Itoh .......................... H04L 9/003
                                                                         380/46

FOREIGN PATENT DOCUMENTS

| CN | 102546157 A | 7/2012 |
|---|---|---|
| CN | 103618595 A | 3/2014 |

(Continued)

OTHER PUBLICATIONS

International Search Report dated Aug. 2, 2017.

*Primary Examiner* — Joseph P Hirl
*Assistant Examiner* — Hassan Saadoun
(74) *Attorney, Agent, or Firm* — Lock Lord LLP; Tim Tingkang Xia, Esq.

(57) ABSTRACT

The present disclosure discloses a mask S-box, a block ciphers algorithm unit, a device and a corresponding construction method. The mask S-box includes an input module, an address mapping processing module, and an output module. The input module receives a random number and an input data which is masked by the random number and uses the random number and the input data as two inputs of the mask S-box. The address mapping processing module performs one-to-one mapping on the two inputs and the corresponding memory address of the mask S-box. The output module linearly processes the random number by using a linear function to obtain the linearly converted random number, which is used as one output of the mask S-box. The memory address obtained by using the linearly converted random number to mask the output of the original S-box is used as the other output of the mask S-box.

9 Claims, 9 Drawing Sheets

(51) Int. Cl.
*G09C 1/00* (2006.01)
*G06F 7/58* (2006.01)
*G06F 9/30* (2018.01)
*H04L 9/00* (2006.01)

(52) U.S. Cl.
CPC ........ *H04L 9/003* (2013.01); *H04L 2209/046* (2013.01); *H04L 2209/08* (2013.01); *H04L 2209/24* (2013.01)

(56) References Cited

FOREIGN PATENT DOCUMENTS

| | | | | |
|---|---|---|---|---|
| CN | 103888247 A | 6/2014 | | |
| CN | 104158649 A | 11/2014 | | |
| CN | 103618595 B | * 3/2017 | ............... | H04L 9/06 |

* cited by examiner

MASK S-BOX, BLOCK CIPHERS ALGORITHM DEVICE AND CORRESPONDING CONSTRUCTION PROCESS

CROSS-REFERENCE TO RELATED APPLICATION

This application is a continuation application of International Patent Application No. PCT/CN2016/112940, filed "MASK S-BOX, BLOCK CIPHERS ALGORITHM UNIT, DEVICE AND CORRESPONDING CONSTRUCTION METHOD" and filed on Dec. 29, 2016, which itself claims the priority to Chinese Patent Application No. 201611198866.3, filed on Dec. 22, 2016 in the State Intellectual Property Office of P.R. China, both of which are expressly incorporated by reference herein in their entirety.

FIELD

The present disclosure relates to the technical field of communication safety, in particular to a construction method for a mask S-box, a construction method for a block ciphers algorithm unit further derived on the basis of the construction method for the mask S-box, and an implementation scheme for a block ciphers algorithm against n-order DPA, which is formed on the basis of the construction method for the block ciphers algorithm unit, and further relates to products corresponding to the above-mentioned methods.

BACKGROUND

At present, the research of practical cryptography is carried out substantially in two directions: a public and private key encryption method represented by Rivest-Shamir-Adleman (RSA), and a block ciphers encryption method of a secret key represented by Data Encryption Standard (DES). The block ciphers algorithm is characterized by fast speed, easy standardization, convenience in hardware and software implementation, etc., usually refers to a core cryptographic algorithm for realizing data encryption, message identification, authentication and key management in information and network security, and is widely applied in the computer communication and information system security. Commonly used block ciphers algorithms include DES, Advanced Encryption Standard (AES) (Rijndael), national secret Super Memory Stick v4 (SMS4), Korean standard ARIA, etc.

The general design principle of the block ciphers algorithm is based on a chaotic principle and a diffusion principle proposed by Shannon. Most of the block ciphers algorithms satisfy the chaotic principle by a non-linear S-box replacement operation and satisfy the diffusion principle by a linear operation. With AES (Rigndael) algorithm as an example, its encryption process includes multiple rounds of S-box (replacement) operation (SubBytes), shift operation (ShiftRows), column mixing operation (MixColumns) and round key operation (AddRoundKey). Its decryption process consists of multiple rounds of inverse operations and round key xor operations. The inverse operations include S-box inverse operation (Inv SubBytes), inverse shift operation (InvShiftRows), and inverse column mixed operation (InvMixColumns). AES is characterized by short key establishment time, good sensitivity, strong anti-attack characteristics, etc., and is widely applied in point of service (POS) machines, smart cards, computer networks and storage systems.

Side channel attack is a way to weaken and compromise the attack from encryption systems by collecting and analyzing information on physical implementation, which is leaked from the encryption systems. The information that can be collected includes time information, power consumption information, electromagnetic radiation information, and the like. Compared to the traditional mathematical method cryptanalysis (algebraic attack), the side channel attack is more efficient in attacking block ciphers algorithms. Differential Power Analysis (DPA) in the side channel attack is one of the most effective attacks on smart card cryptographic equipment. The DPA attack makes use of the dependency of the energy consumption of the cryptographic equipment to data, analyzes the energy consumption of the equipment at a fixed time by using a large number of energy traces, and takes the energy consumption as a function of the processed data. The first-order DPA attack may predict certain intermediate value and may use this prediction value in the attack. The high-order DPA attack makes use of some kind of joint leak, which is based on a plurality of intermediate values that are present in the cryptographic equipment. The high-order DPA attack method that achieves an attack purpose by means of the joint leak of the two intermediate values related to the same mask is referred to as a second-order DPA attack.

An effective way of confrontation energy analysis is to use a masking strategy. The goal of any defensive strategy is to eliminate or hide the correlation between the energy consumption of the cryptographic equipment and the operation performed by the equipment as well as the processed data (intermediate value). The masking technique achieves this goal by randomizing the intermediate values processed by the cryptographic equipment. Its core mechanism lies in that a random number mask (in a digital circuit, it is general to xor $\oplus$ to have an original operand and a parity long random number) is added in the data operation process and then removed after the operation is completed. In this way, the power consumption, which is generated during the operation, is related to the masked operand, and not statistically related to the original operand.

Mask protection is very easy to implement in digital circuits. In addition, in linear operations, a mask can be added or removed by simple xor, and the results of linear operations with or without masking are consistent. In the block ciphers algorithm, the mask protection is widely used in linear operation steps, such as linear shift (ShiftRows), column mixing (MixColumns) and round keys XOR (AddRoundKey). For the non-linear operation of S-box replacement, it is necessary to adopt an implementation way different from linear operation to achieve an S-box replacement operation with a mask.

Existing S-boxes are generally implemented by adopting lookup tables or finite domain calculations. The S-box that is implemented by adopting the lookup table may be masked in the following way: keeping an input-output mapping relation of the S-box unchanged, and using a fixed random value to xor (exclusive OR) the output value of the S-box to achieve the purpose of outputting a mask; or enabling the input to shift a fixed address and using the fixed random number to xor the output. Such mask S-box implementation method is relatively simple, but poor in the security, and an attacker may eliminate output masks (the output masks of two S-box operation results are identical) by performing XOR processing on the two sampled S-box operation results.

The S-box, which is implemented by adopting the finite domain calculation method, internally contains a series of addition and multiplication operations. Therefore, the mask type S-box needs to satisfy masking for addition and multiplication. However, the mask S-box employing finite domain operations has a dramatic increase in its critical path length and implementation area. The article "A Masked AES ASIC Implementation" pointed out that the implementation area of a composite domain arithmetic mask S-box would increase by 2 to 3 times, and the speed would be reduced by ⅓ to ½ compared with the corresponding original S-box implementation. In addition, the most critical point is that the composite domain arithmetic mask S-box is invalid for the case where the intermediate value is zero, which is determined by the main drawback (invalid for value 0) of mask multiplication. This drawback widely appears in (first order) DPA attacks against such S-boxes.

The literature "Thwarting Higher-Order Side Channel Analysis with Additive and Multiplicative Masking" proposed a method of using the Secure Dirac Function to achieve the conversion between the addition and the multiplication that can resist high-order DPA attack, and the method is implemented using such mask S-boxes. The security conversion between the addition and multiplication provided in this paper requires the following steps: mapping from composite domain $(GF(2^n)*)^m$ that contains 0 element to composite domain $(GF(2^n)*)^m$ that does not contain 0 element; conversion from a modular addition operation to a modular multiplication operation; power function operation; conversion from a molecular multiplication operation to a modular addition operation; mapping from composite domain $(GF(2^n)*)^m$ that does not contain 0 element to composite domain $(GF(2^n)*)^m$ that contains 0 element, etc. The resistance of this method to any high-order DPA is safe and provable. However, with the increased demand on the resistance to the order number of DPA, circuit complexity, area overhead, critical path, power consumption, which are essential for implementing this method, will rise sharply, and the difficulty of its implementation will increase dramatically.

SUMMARY

To solve the problems present in the prior art, the present disclosure provides a mask S-box. The mask S-box satisfies the following linear function: $S'[X',R]=S'[X \oplus R,R]=S(X) \oplus f_r(R)$. The mask S-box includes an input module, an address mapping processing module, and an output module. The input module receives a random number and an input data that has been masked by the random number, and uses the random number and the input data as two inputs of the mask S-box. The address mapping processing module performs one-to-one mapping on the two inputs and the corresponding memory address of the mask S-box according to an address mapping function $f_a(X',R)$. The output module linearly processes the random number by using a linear function $f_r(R)$, so as to obtain the linearly converted random number and use the linearly converted random number as one output of the mask S-box. The content stored in the memory address pointed by $f_a(X',R)$ is a result obtained by performing XOR processing with the random number which is linearly processed by $F_r(R)$ and an output data which is output after a lookup operation of an original S-box. The output data is used as the other output of the mask S-box.

There is further provided a construction method for the mask S-box. The method includes the following steps: (a) using a random number to mask an original input data to obtain an input data, and then using the random number and the input data as inputs of the mask S-box; (b) obtaining a corresponding memory address of the mask S-box through an address mapping function by inputting the random number and the input data into the address mapping function, wherein the address mapping function satisfies a one-one mapping condition, and the content stored in the memory address is output data obtained by using the linearly converted random number to mask an original output data; and (c) outputting the output data and the linearly converted random number after the lookup operation of the mask S-box.

The mask S-box construction method of the present disclosure may be used in a block ciphers algorithm of an S-box that contains a lookup table. In a replacement step of the block ciphers S-box, a new random number mask value may be introduced each time, thereby increasing the randomness of the power consumption in the S-box replacement step and increasing the difficulty of implementing the DPA attack to the S-box replacement step. By means of the mask S-box, an address of the lookup table inside the mask S-box is protected by the random number, and the input data and the output data are masked. Operands that are not subject to masking protection may not be exposed in the whole S-box operation process. In addition, the mask S-box is easy to implement, low in power consumption and small in area without sacrificing the security, and is further optimized and expanded to realize the mask S-box against high-order DPA.

The present disclosure further provides a block ciphers algorithm unit which is constructed on the basis of the above mask S-box. The block ciphers algorithm unit includes the following submodules: a random number generator, a key processing module, a message input selector, an input processing module, a mask S-box, a mask value round linear logic module, a data round linear logic module, and a mask removal module.

The random number generator is used to generate a random number required for each operation, and the random number is used as one input of the mask S-box. The key processing module is configured to mask an original key by using the random number of the current round to generate a mask key during a beginning round, and mask the mask value which is output in the last round of iterative operation and the random number of current round to generate a mask key during an iteration round. The message input selector is configured to select an original input data and output the original input data during the beginning round, and select an output data which is output in the last round of iterative operation as an input data and output the input data during the iteration round. The input processing module is configured to perform a data key xor operation (e.g., AddRoundKey in AES) on the data which is outputted from the message input selector by the mask key, and use the data subject to data key xor operation as the other input of the mask S-box. The mask S-box receives two inputs and performs the S-box lookup process, and outputs the linearly converted random number and output data. The mask value round linear logic module processes the linearly converted random number which is outputted from the mask S-box by using a mask value round linear function, and provides the processed random value by the function for next iterative operation when the iterative operation is not completed. The data round linear logic module processes the data which is outputted from the mask S-box by using a data round linear function, and provides the processed output data as an input data of the next iterative operation when the iterative operation is not completed. The mask removal module is a selectable module. When a block ciphers algorithm is implemented by using a single block ciphers algorithm unit, a mask removal module is needed. After performing XOR processing with the results which are outputted from the mask value round linear logic module and the data round linear logic module, the mask removal module removes a mask to obtain a final operation result. When the block ciphers algorithm unit is a calculation branch of a symmetric encryption device against high-order side channel attack to implement a block ciphers algorithm against n-order DPA, the mask removal module is not needed. The result which is outputted from the data round linear logic module of the single block ciphers algorithm unit is used as a final output result of the block ciphers algorithm unit, and then, the results of a plurality of block ciphers algorithm units are subject to XOR processing finally using the block ciphers algorithm against n-order DPA (the symmetric encryption implementation method against high-order side channel attack) to obtain a calculation result of the block ciphers algorithm against n-order DPA.

There is further provided a method for constructing the block ciphers algorithm unit based on the construction method for the above mask S-box at the same time. The method includes 0-th round operation step and an iterative operation step.

The 0-th round operation step includes the following step: (a) using the random number generator to generate a random number required for the current round; and using the message input selector to select an original input data as an original input data of the current round; (b) using the random number to mask an original key of the current round to obtain a key of current round; using the key of current round to perform an AddRoundKey operation on the original input data of the current round to obtain an input data of the mask S-box of the current round; inputting the random number and the input data to the mask S-box, and performing a lookup operation of the mask S-box to obtain two outputs of the mask S-box; and inputting the linearly converted random number and the output data, which are outputted from the mask S-box, to a mask value round linear function and a data round linear function, respectively to obtain two outputs for participating in next round of iterative operation.

The iterative operation step includes: (a) using the random number generator to generate a random number required for the current round; and using the message input selector to select an output result of the data round linear function in the last round as an original input data of the current round; (b) using the output result of the mask value round linear function in the last round and the random number of the current round to mask the original key of the current round to generate a masked key of current round; using the key of current round to perform an AddRoundKey operation on the original input data of the current round to obtain an input data of the mask S-box of the current round; inputting the random data and the input data to the mask S-box, and performing a lookup operation of the mask S-box to obtain two outputs of the mask S-box; inputting the linearly converted random number and the output data, which are outputted from the mask S-box, to the mask value round linear function and the data round linear function, respectively to obtain two outputs for participating in next round of iterative operation; and repeating the above iterative operation step till the iteration is completed. The result which is outputted from the data round linear function in the final round of iterative operation is output directly, or the result which is outputted from the data round linear function and the result which is outputted from the mask value round linear function in the final round of iterative operation are subject to XOR processing and used as final calculation results of the block ciphers algorithm.

In one configuration of the algorithm unit, the masked intermediate calculation result and the current corresponding mask value are independent of each other in storage and round linear operations. When all the operations are ended, the final calculation result of the block ciphers algorithm can be obtained from the calculation result masked by XOR processing and the current mask value. In addition, different power consumption and security requirements may be achieved by selecting a parallel linear operation or a time division multiplexing linear operation that is performed on the masked intermediate result and the current mask value. When it is selected to perform the parallel linear operation, the difficulty of implementing DPA attack on a power consumption curve may be increased while increasing the operation speed. When it is selected to perform the time division multiplexing linear operation, the area overhead and the power consumption may be reduced.

The present disclosure further provides a symmetric encryption device against high-order side channel attack, which is based on the above block ciphers algorithm unit. The symmetric encryption device includes a mask value module, a message module, n+1 block ciphers algorithm units and an xor output module. The mask value module includes a mask value set $R_0, R_1, \ldots, R_n$ composed of n+1 random numbers, and the mask parts satisfy: $R_0 \oplus R_1 \oplus \ldots \oplus R_n = 0$. N is a natural number that is larger than or equal to 0. The message module divides a message X into n+1 message subparts to form a message set $X_0, X_1, \ldots, X_n$. The n+1 block ciphers algorithm units receive the n+1 mask subparts and use the n+1 mask subparts as input random numbers of the n+1 block ciphers algorithm units respectively; receive the n+1 message subparts and use the n+1 message subparts as original input data of the n+1 block ciphers algorithm units respectively in the 0th round. The xor output module is configured to perform XOR processing on the outputs of the n+1 block ciphers algorithm units to obtain a block ciphers operation result of the message X.

There is further provided a symmetric encryption implementation method against high-order side channel attack, which is based on the construction method for the above block ciphers algorithm unit. The symmetric encryption implementation method includes the following steps: (a) taking n+1 random numbers to form a mask value set, wherein the mask subparts satisfy: $R_0 \oplus R_1 \oplus \ldots \oplus R_n = 0$, and n is a natural number which is larger than or equal to 0; dividing a message X into n+1 message subparts to form a message set $X_0, X_1, \ldots, X_n$; (b) dividing a round key RK into n+1 round key subparts to form a round key set $RK_0, RK_1, \ldots RK_n$; (c) taking the n+1 mask subparts as input random numbers of the n+1 block ciphers algorithm units, respectively; (d) taking the n+1 message subparts as original input data of the n+1 block ciphers algorithm units respectively in the 0th round; (e) taking the n+1 round key subparts as original round keys of the n+1 block ciphers algorithm units respectively in the 0th round; performing an iterative operation on the block ciphers algorithm unit still the iterative operation is completed; and (f) performing an xor operation on the output results of the block ciphers algorithm units to obtain a final result.

In one configuration of a symmetric encryption implementation method against high-order side channel attack, there are two specific implementation schemes to choose: in the first scheme, the n+1 algorithm units perform parallel calculation, wherein each algorithm unit completes calculation of one subpart and one random number mask sequence of the message X; in the second scheme, the same algorithm unit is subject to time division multiplexing, wherein the calculation of one subpart and one random number mask sequence of the message X is completed each time, by n+1 times totally. The first scheme may increase the speed of operation and increase the difficulty of implementing the n-order DPA attack on the power consumption curve. The second scheme can reduce the area overhead and the power consumption.

The implementation scheme of the block ciphers algorithm against n-order DPA based on composite domain calculation and Secure Dirac Function has a sharp increase of design complexity with the increased demands on the security (n value increases), the power consumption of a circuit, the area, the critical path and other parameters will rise sharply, and the reusability level of the circuit is not high. While the implementation scheme of a block ciphers algorithm against n-order DPA provided by the present disclosure has the advantages of high circuit reusability, easy modification and design according to the demands on the area, the power consumption, the security and the like, small area and low power consumption overhead.

DETAILED DESCRIPTION

Figure 1:
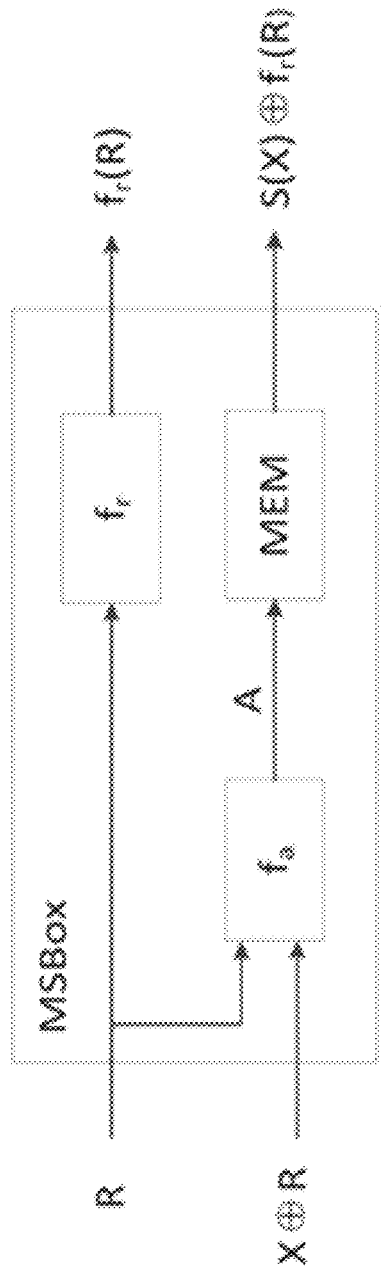
FIG. 1 is a schematic structural view of a mask S-box according to the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of the encryption systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The principles and methods of the present disclosure will now be described in detail with reference to the accompanying drawings.

FIG. 1 illustrates a schematic structural view of a mask S-box MSBox according to the present disclosure. The mask S-box has an input module, an output module and an address mapping processing module.

The input module receives two inputs, which are a random number R and an input data X⊕R respectively, wherein the random number R is a mask value of an original input data and has the same bit width with the original input data and the input data X⊕R, while the input data X⊕R is an input data which is formed after the original input data X has been masked through an xor operation.

The address mapping processing module includes an address mapping function $f_a$, and the masked input data and the mask value are combined to address mapping of a memory MEM, i.e., $A=f_a(X \oplus R, R)$. The inputs of the mapping function $f_a$ are the random number R as the mask value and the masked input data X⊕R, and the output thereof is an address A of the memory MEM. The mapping function $f_a$ may be linear or non-linear (for example, an integer bit among 1 to 15 of cyclic left shift or cyclic right shift), but satisfies one-to-one mapping of the input and the output. The memory MEM may be MEM constructed using ROM, the content stored in the address A of the memory is S(X)⊕$f_r$(R), the input is a result A of the address mapping function $f_a$, and the output is a lookup result of the masked original S-box (that is mask S-Box). That is, the input of the mask S-box is processed with the address mapping function $f_a$ (X', R) to obtain the address A, and then the stored content S(X)⊕$f_r$(R) is read from the memory address A of the mask S-box as one output of the mask S-box.

The output module has a linear function $f_r$ by which the output module performs linear processing on the random number R to obtain a linearly converted random number (also referred to as an output mask $f_r$(R)) as the other output of the mask S-box. The linear function $f_r$ may be formed by linear operations, such as cyclic left shift, cyclic right shift or xor. The output mask $f_r$(R) is a linear combination of an input mask (the random number R) and may be calculated from the random number R through the linear function $f_r$.

Finally, the input-output of the mask S-box of the present disclosure satisfies: S'[X', R]=S'[X⊕R, R]=S(X)⊕$f_r$(R), wherein X is an input of the original S-box, X' is the input data X⊕R, and S(X) is an output of the original S-box. Meanwhile, the mask S-box may further output a linear conversion result (the output mask $f_r$(R)) of the random number R.

The address mapping function $f_a$ and the linear function $f_r$ decide a mapping mode between the address and the content of the mask S-box and the output mask. Once the two functions are determined, the generated mask S-box is fixed. Once any of the two functions changes, it is necessary to reinitiate the mask S-box.

In the block ciphers algorithm implementation, mask protection is easy to implement in linear operations, such as a column mixing operation, a shift operation and a round key XOR operation, but is difficult to implement in S-box lookup in a linear operation. The present disclosure provides a new construction method for a mask S-box now, such that the non-linear operation of the S-box is converted into a linear-likelihood operation, thereby ensuring that data inputted to the S-box and data outputted from the S-box are masked data, an address of a lookup table inside the S-box is scrambled and data is masked, and increasing the security of the S-box.

The block ciphers algorithm is usually composed of S-box non-linear operations and several linear operations in a form of cyclic iteration. In cyclic rounds, an output operand of the last round is an input operand of the next round of operation, and a round key expansion is operated independently. In order to facilitate the description of how to use the mask S-box to perform a block ciphers operation and follow the calculation of a mask value of an intermediate result, the block ciphers operation is broken down into three major parts: the first part refers to operations of an 0th operand and a round key; the second part refers to multiple rounds of iterative operations, including S-box lookup and several linear operations (the last iteration of part of the block ciphers algorithm is slightly different from the other rounds, and here, in order to simplify the description, the last iteration is incorporated into multiple rounds of iterations); the third part refers to the removal of a mask and the output of a final result. In addition to the third part of removing the mask, operations in the first part and the second part are required to be performed in case where the mask is applied.

The keys to design a typical mask-based security protection scheme are how to perform a masking operation of an intermediate value, how to follow the calculation of the mask value of the intermediate value, and how to add, eliminate and change (a new mask value is introduced) the mask. In the present disclosure, an initial mask value is generated by the random number generator, and is added to an original data in the first part of the block ciphers operation (such as 0th AddRoundKey in AES). In the operation of the second part, the operation of the mask value of the intermediate result needs to follow the intermediate result, and then is subject to XOR processing with the AddRoundKey operation result after XOR processing of a new random number of each round and the round key (a random number mask of the current round is introduced), so as to remove the old mask (the mask of the last round). In the linear operation of the second part, the masked intermediate result and the current mask value need to be subject to linear operation.

Figure 2:
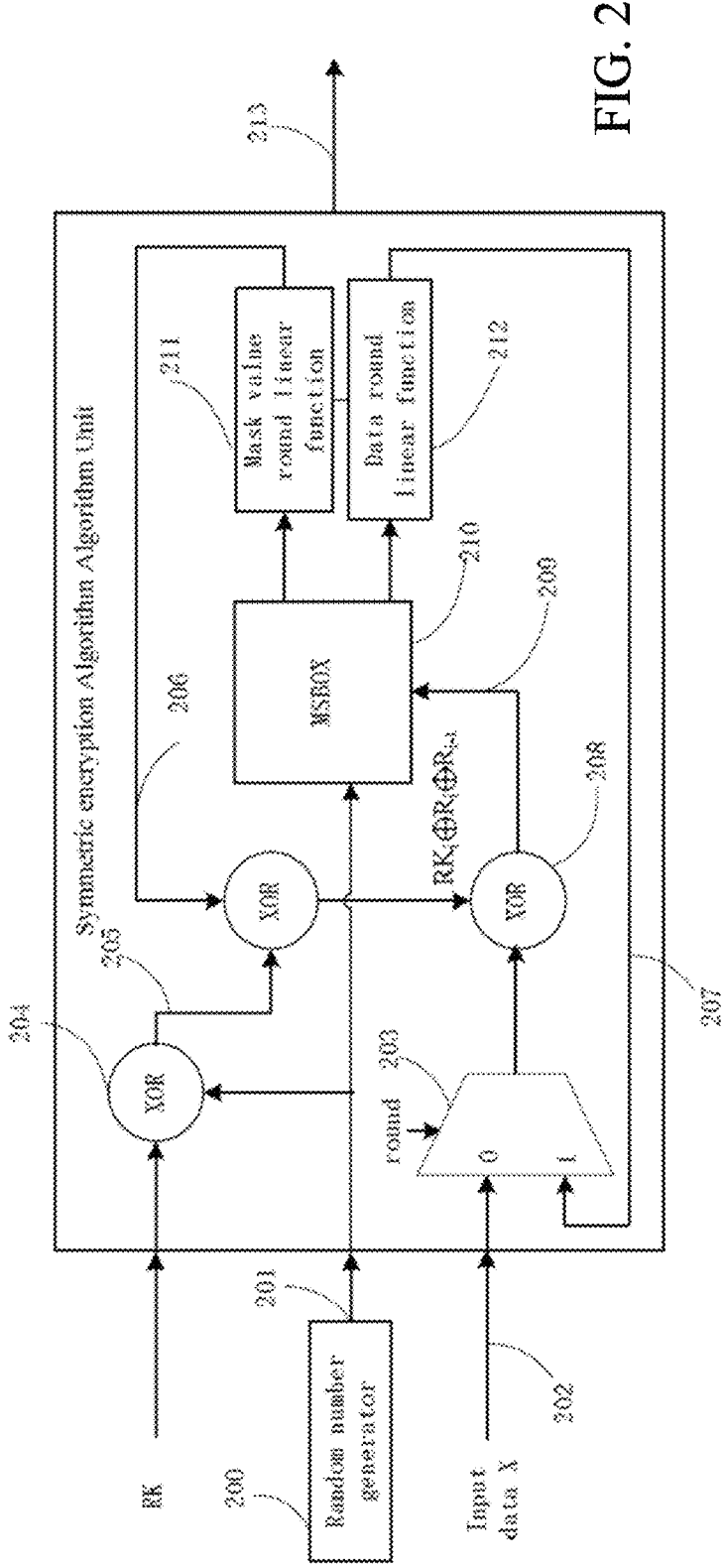
FIG. 2 is a schematic structural view of a block ciphers algorithm unit according to the present disclosure.

FIG. 2 is a schematic view of a block ciphers algorithm unit that is constructed by using the mask S-box. The block ciphers algorithm unit includes a random number generator, a key processing module, a message input selector, an input processing module, a mask S-box, a mask value round linear logic module and a data round linear logic module. The random generator is configured to generate a random number $R_i$ (0≤i<iterative times). From the 0th iterative operation to the end of the iterative operation, a new random number will be generated each time as an initial mask value, and the random number generated each time will be used as one input of the mask S-box of the current round.

The key processing module is configured to use the random number of the current round to mask an original key to generate a mask key during a beginning round, and further mask a mask value R'$_{i-1}$ outputted in the iterative operation of the last round to generate a mask key RK$_i$⊕R$_i$⊕R'$_{i-1}$ in addition to using the random number of current round to mask the original key to obtain RK$_i$⊕R$_i$ during an iterative round.

The message input selector is configured to select an original input data X and output the original input data X during the beginning round, and select the output data X'$_{i-1}$⊕R'$_{i-1}$ (the intermediate data has been masked) outputted in the last round of iterative operation as the input data $X_i$ and output the input data $X_i$ during the iterative round. The original input data X is an input of the original S-box and is plain without being masked, and in order to prevent DPA attack, a plain data and a plain key cannot collide directly.

The input processing module is configured to perform an AddRoundKey operation on the data outputted from the message input selector and use the data subject to the AddRoundKey operation as the other input of the mask S-box.

The mask S-box is configured to receive two inputs and perform the S-box lookup process, and output the linearly processed random number and output data.

The mask value round linear logic module is configured to process the linearly converted random number outputted from the mask S-box by using a mask value round linear function, and provide the processed random value for next iterative operation when the iterative operation is not completed.

The data round linear logic module is configured to process the output data of the mask S-box by using a data round linear function, provide the processed output data as an input data of the next iterative operation when the iterative operation is not completed, and output the processed data as a final result after the iterative operation is completed.

The mask removal module is a selectable module. When the block ciphers operation is implemented by using the single block ciphers algorithm unit, the mask removal module is needed. The mask removal module is configured to perform XOR processing with the results that are outputted from the mask value round linear logic module and the data round linear logic module to remove a mask to obtain a final calculation result. When the block ciphers algorithm unit is a calculation branch of a symmetric encryption device against high-order side channel attack to implement a block ciphers algorithm against n-order DPA, the mask removal module is not needed. The result which is outputted from the data round linear logic module of the single block ciphers algorithm unit is used as a final output result of the block ciphers algorithm unit, and then, the results of a plurality of block ciphers algorithm units are subject to XOR processing finally by using the block ciphers algorithm against n-order DPA to obtain a calculation result of the block ciphers algorithm against n-order DPA.

The specific construction method includes a 0th round operation step and an iterative round operation step.

In the 0th round operation step, the random number generator is used to generate a random number $R_i$ required for the current round; the message input selector is used to select the original input data $X_i$ as an original input data of the current round; the random number $R_i$ is used to mask an original key $Rk_i$ of the current round to obtain a key $RK_i \oplus R_i$ of current round; the original input data $X_i$ of the current round is subject to an AddRoundKey operation by using the current round key to obtain input data $X_i \oplus RK_i \oplus R_i$ of the mask S-box of the current round; the random number $R_i$ and the input data $X_i \oplus RK_i \oplus R_i$ are inputted to the mask S-box, and then a lookup operation of the mask S box is performed to obtain two outputs of the mask S-box.

The linearly processed random number and the output data, which are outputted from the mask S-box, are input to the mask value round linear function and the data round linear function respectively to obtain two outputs for participating in the iterative operation of the next round. In the next round of iterative operation, labels of the two outputs are changed as $R'_{i-1}$ and intermediate data $X'_{i-1}$.

In the iterative operation step, the random number generator is used to generate a random number required for the current round; the message input selector is used to select an output result $X'_{i-1} \oplus R'_{i-1}$ of the data round linear function in the next round as an original input data $X_i$ of the current round; the output result $R'_{i-1}$ of the mask value round linear function in the last round and the random number $R_i$ are used to mask an original key of the current round to obtain a masked key of the current round; the original input data of the current round is subject to AddeRoundKey processing by using the key of the current round to obtain an input data of the mask S-box of the current round; after the mask value $R'_{i-1}$ outputted in the last round is subject to XOR processing with the original key and the random number, the mask value of the last current may be removed in the AddeRoundKey step, and is a mask value $R_i$ of the current round reserved. The random number and the input data are inputted to the mask S-box, and then a lookup operation of the mask S-box is performed to obtain two outputs of the mask S-box. The linearly converted random number and the output data, which are outputted from the mask S-box, are respectively input to the mask value round linear function and the data round linear function to obtain two outputs for participating in the next round of iterative operation.

The above iterative operation step is repeated till the iteration is completed. After the iterative operation is completed, a final output result Y of the masked intermediate data is subject to XOR processing with an output of the mask value round linear logic module of the last round, such that a final result of the mask-removed block ciphers algorithm may be obtained.

Figure 3:
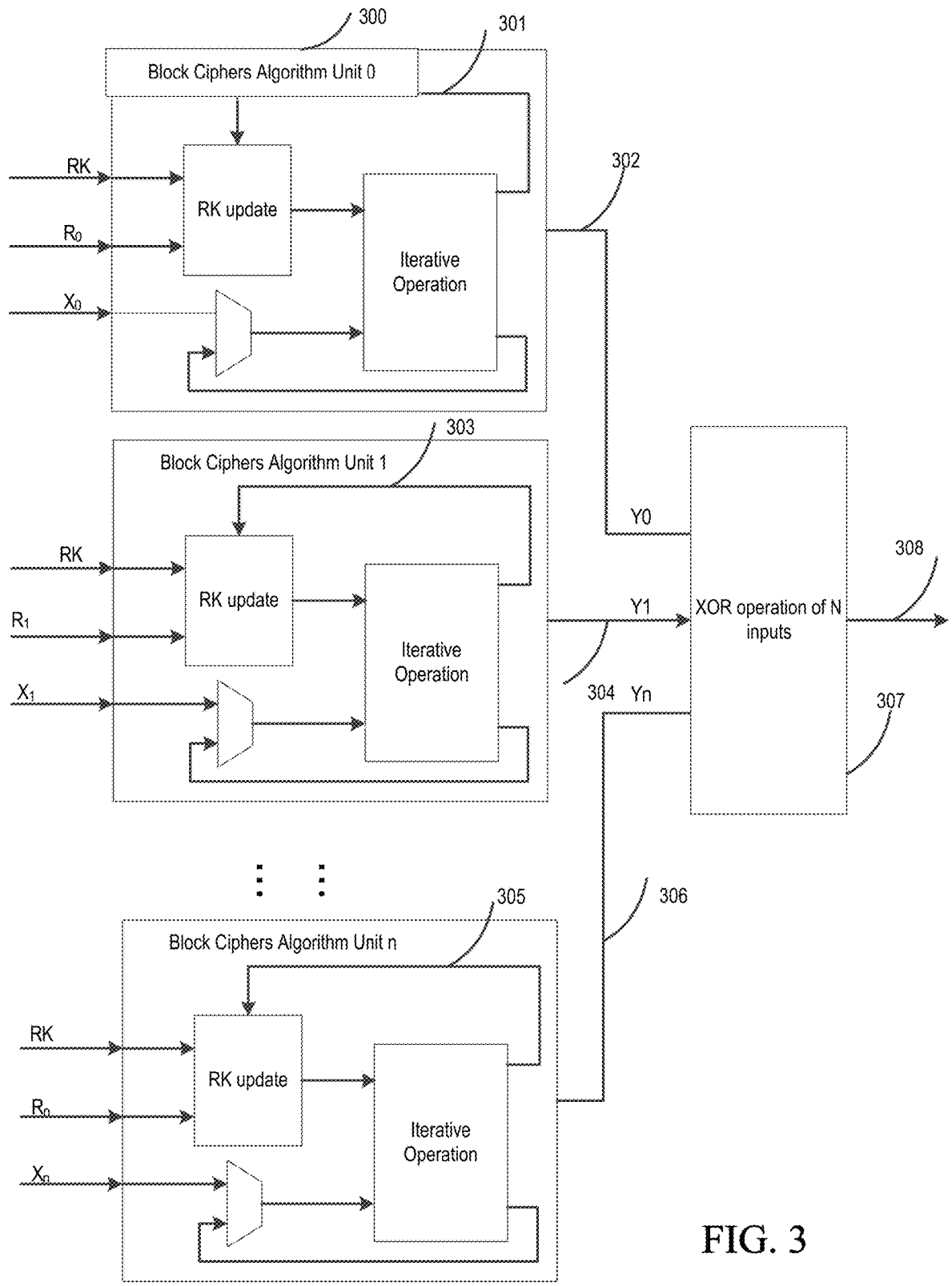
FIG. 3 is a schematic structural view of a block ciphers algorithm device against n-order DPA according to the present disclosure.

FIG. 3 illustrates a symmetric encryption device against high-order side channel attack, which is constructed by a plurality of block ciphers algorithm units. The device includes n+1 mask value modules, n+1 message modules, n+1 round key modules, n+1 block ciphers algorithm units and one xor output module. N is a natural number that is larger than or equal to 0. Each block ciphers algorithm unit in FIG. 3 is identical with the unit in FIG. 2 in structure. In order to facilitate the display, the structure is also simplified in FIG. 3.

The mask value module includes a mask value set $R_0, R_1, \ldots, R_n$ composed of n+1 random numbers, and the mask subparts satisfy: $R_0 \oplus R_1 \oplus \ldots \oplus R_n = 0$.

The message module divides a message X into n+1 message subparts to form a message set $X_0, X_1, \ldots, X_n$, and the message subparts satisfy: $X0 \oplus_X 1 \oplus \ldots \oplus Xn = X$.

The round key module divides a round key RK into n+1 round key subparts to form a round key set $RK_0, RK_1, \ldots, RK_n$, the round key subparts satisfy: $RK_0 \oplus RK_1 \oplus \ldots \oplus RK_n = RK$.

The block ciphers algorithm units receive the mask subparts and use the mask subparts as random numbers inputted there from respectively, receive the message subparts and use the message subparts as original input data of the 0th round, and receive the round key subparts and use the round key subparts as original round keys of the 0th round.

The xor output module is configured to perform XOR processing on the outputs of the n+1 block ciphers algorithm units to obtain a block ciphers operation result of the message X.

Figure 4:
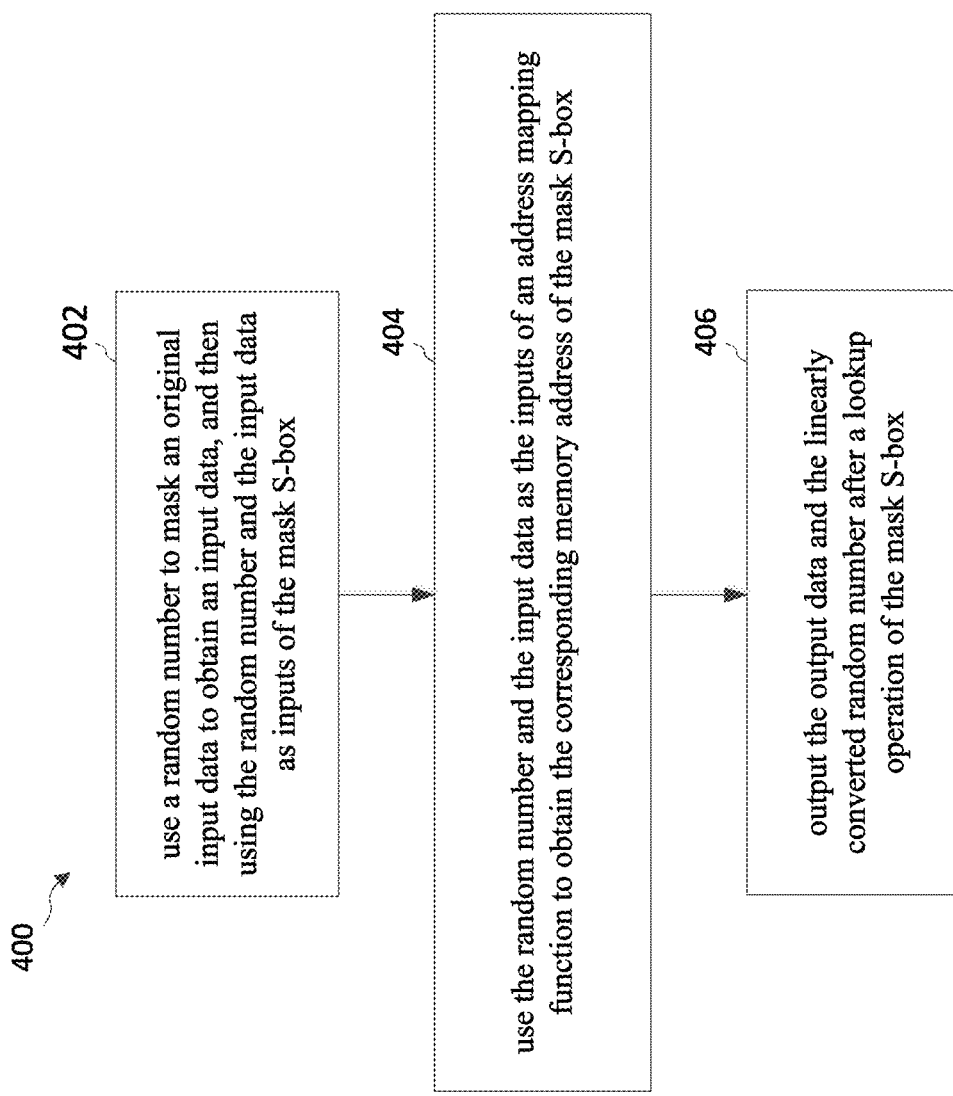
FIG. 4 is a flowchart of a method of constructing a mask S-box.

FIG. 4 is a flowchart 400 of a process of constructing a mask S-box. The process may be performed by an encryption device (e.g., a processing system 1000).

At operation 402, the encryption device uses a random number to mask an original input data to obtain an input data, and then using the random number and the input data as inputs of the mask S-box. At operation 404, the encryption device uses the random number and the input data as the inputs of an address mapping function to obtain the corresponding memory address of the mask S-box, the address mapping function satisfies a one-one mapping condition, and the content stored in the corresponding memory address is an output data which is obtained by using the linearly converted random number to mask the original output data. At operation 404, the encryption device outputs the output data and the linearly converted random number after a lookup operation of the mask S-box.

Figure 5:
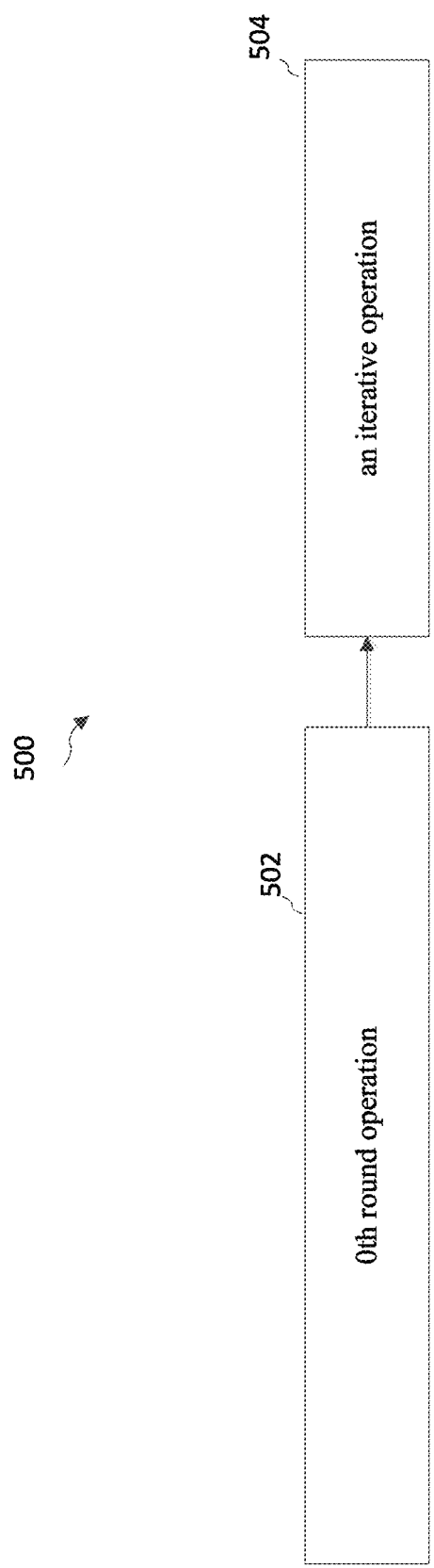
FIG. 5 is a flowchart of a method of constructing a block ciphers algorithm device.

FIG. 5 is a flowchart 500 of a process of constructing a block ciphers algorithm device. The process may be performed by the encryption device. The process includes a 0th round operation step 502 and an iterative operation step 504.

Figure 6:
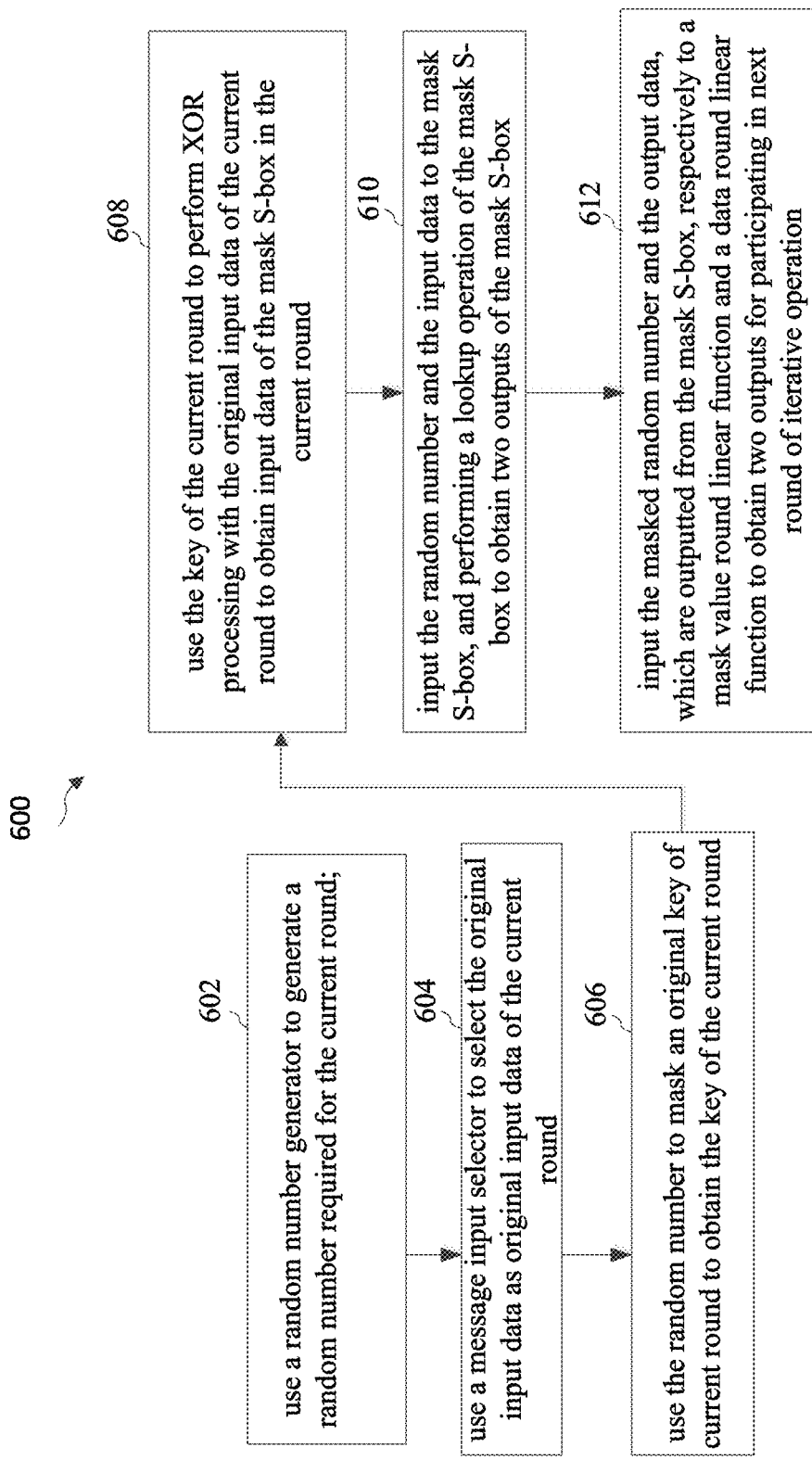
FIG. 6 is a flowchart of a 0th round operation of the method of constructing the block ciphers algorithm device of FIG. 5.
Figure 7:
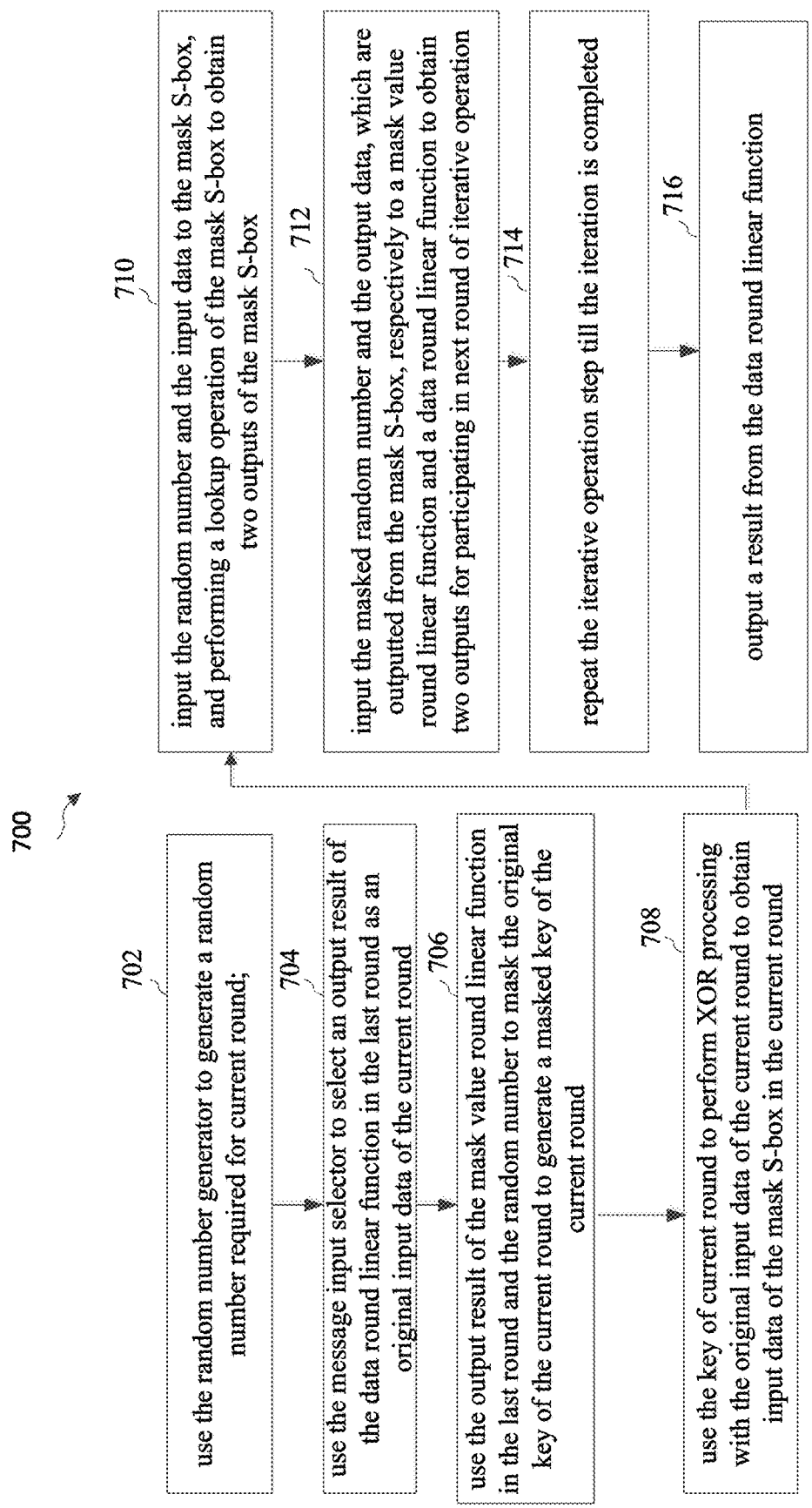
FIG. 7 is a flowchart of an iterative operation of the method of constructing the block ciphers algorithm device of FIG. 5.

FIG. 6 is a flowchart 600 of the 0th round operation 502. At operation 602, the encryption device uses a random number generator to generate a random number required for the current round. At operation 604, the encryption device uses a message input selector to select the original input data as original input data of the current round. At operation 606, the encryption device uses the random number to mask an original key of current round to obtain the key of the current round. At operation 608, the encryption device uses the key of the current round to perform XOR processing with the original input data of the current round to obtain input data of the mask S-box in the current round. At operation 610, the encryption device inputs the random number and the input data to the mask S-box, and performs a lookup operation of the mask S-box to obtain two outputs of the mask S-box. At operation 612, the encryption device inputs the masked random number and the output data, which are outputted from the mask S-box, respectively to a mask value round linear function and a data round linear function to obtain two outputs for participating in next round of iterative operation;

FIG. 7 is a flowchart 700 of the iterative operation 504. At operation 702, the encryption device uses the random number generator to generate a random number required for current round. At operation 704, using the message input selector to select an output result of the data round linear function in the last round as an original input data of the current round. At operation 706, the encryption device uses the output result of the mask value round linear function in the last round and the random number to mask the original key of the current round to generate a masked key of the current round. At operation 708, the encryption device uses the key of current round to perform XOR processing with the original input data of the current round to obtain input data of the mask S-box in the current round. At operation 710, the encryption device inputs the random number and the input data to the mask S-box, and performing a lookup operation of the mask S-box to obtain two outputs of the mask S-box. At operation 712, the encryption device inputs the masked random number and the output data, which are outputted from the mask S-box, respectively to a mask value round linear function and a data round linear function to obtain two outputs for participating in next round of iterative operation. At operation 714, the encryption device repeats the iterative operation step till the iteration is completed. At operation 716, the encryption device outputs a result from the data round linear function and the result outputted from the mask value round linear function in the final round of iterative operation are subject to XOR processing to obtain a final calculation result of the block ciphers algorithm after the iteration is completed.

Figure 8:
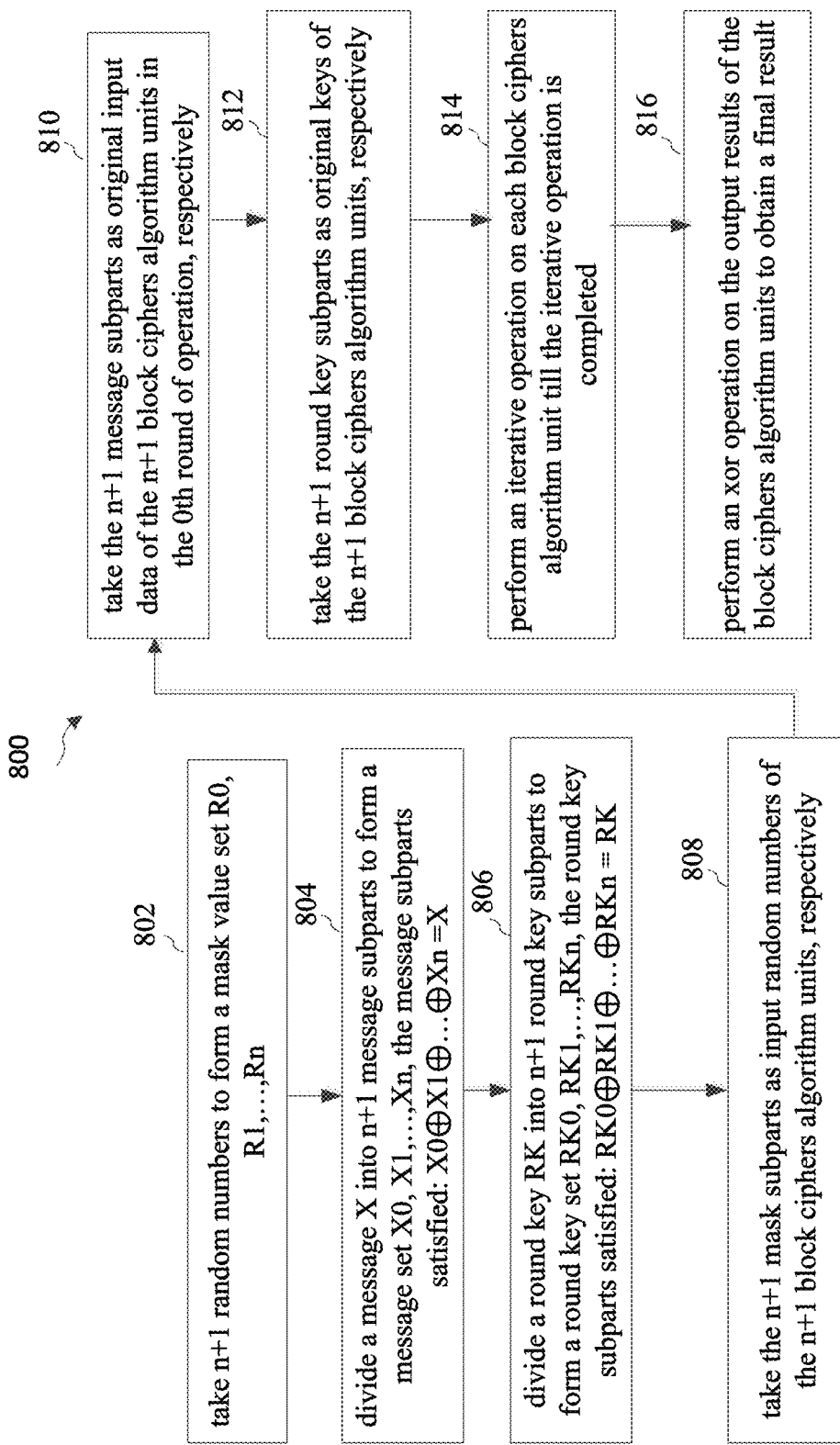
FIG. 8 is a flowchart of a method of an implementation method for constructing a symmetric encryption algorithm against high-order side channel attack.

FIG. 8 is a flowchart 800 of a process of an implementation method for constructing a symmetric encryption algorithm against high-order side channel attack. The process may be performed by the encryption device. At operation 802, the encryption device takes n+1 random numbers to form a mask value set $R_0, R_1, \ldots, R_n$, wherein the mask subparts satisfy: $R_0 \oplus R_1 \oplus \ldots \oplus R_n = 0$, and n is a natural number which is larger than or equal to 0. At operation 804, the encryption device divides the message X into n+1 message subparts to form a message set $X_0, X_1 \ldots, X_n$. The message X is a plain input data of the original S-box. At operation 806, the encryption device divides a key RK into n+1 round key subparts to form a key set $RK_0, RK_1, \ldots, RK_n$. The key RK is an original key. At operation 808, the encryption device takes the n+1 mask subparts as input random numbers of the n+1 block ciphers algorithm units respectively. At operation 810, the encryption device takes the n+1 message subparts as original input data of the n+1 block ciphers algorithm units respectively in the 0th round. At operation 812, the encryption device takes the n+1 round key subparts as original keys of the n+1 block ciphers algorithm units respectively. At operation 814, the encryption device performs an iterative operation on each block ciphers algorithm unit till the iterative operation is completed. At operation 816, the encryption device performs an xor operation on the output results of the block ciphers algorithm units to obtain a final result.

In the 0th iterative operation of the block ciphers algorithm unit, the plain round key subparts ($RK_0, RK_1, \ldots, RK_n$) are masked by using the random number set ($R_0, R_1, \ldots, R_n$) to form n+1 mask keys ($RK_0', RK_1', \ldots, RK_n'$) first; the input X of the original S box is subject to XOR processing with the n+1 mask keys ($RK_0', RK_1', \ldots, RK_n'$) to obtain n+1 subparts ($X_0', X_1', \ldots, X_n'$) to complete the AddRoundKey operation of the 0th round. The n+1 mask subparts satisfy: $X_0' \oplus X_1' \oplus \ldots \oplus X_n' = X \oplus RK$.

The n+1 random numbers and the n+1 mask subparts are combined to form n+1 branch operands ($X_0', R_0$), ($X_1', R_1$), ..., ($X_n', R_n$). Each branch operand is subject to an independent symmetric algorithm operation by using the mask S-box to obtain n+1 branch result sets ($Y_0, Y_1, \ldots, Y_n$). The linear conversion results of the n+1 random numbers are subject to a linear operation after the S-box to obtain n+1 results, thereby obtaining a round output mask set ($R_0', R_1', \ldots, R_n'$).

The n+1 branch result sets ($Y_0, Y_1, \ldots, Y_n$) are iterated to enter the next round. The n+1 random numbers of the next round need to be iterated to the round output mask set ($R_0', R_1', \ldots, R_n'$) of the last round. After a new mask set is introduced, the round output mask set of the last round is removed from the interior of the algorithm unit in a manner of XOR processing.

If it is the last round, the n+1 branch results $Y_0, Y_1, \ldots, Y_n$ are subject to XOR processing together to obtain the final result.

The operations of n+1 branches may be implemented in parallel and share one block ciphers algorithm unit. The n+1 branch operations may also be in parallel, for example, n+1 block ciphers algorithm units. The former can save the circuit area and reduce the power consumption. The attacker cannot obtain the message X even if he/she analyzes the information on the branch, because it is one of sub-components of the original message X. If the parallel implementation way is used, the speed of operation will increase significantly, and because the operations of the (n+1) branches are carried out at the same time, it is hard for the attacker to analyze the sub-components of the message.

Figure 9:
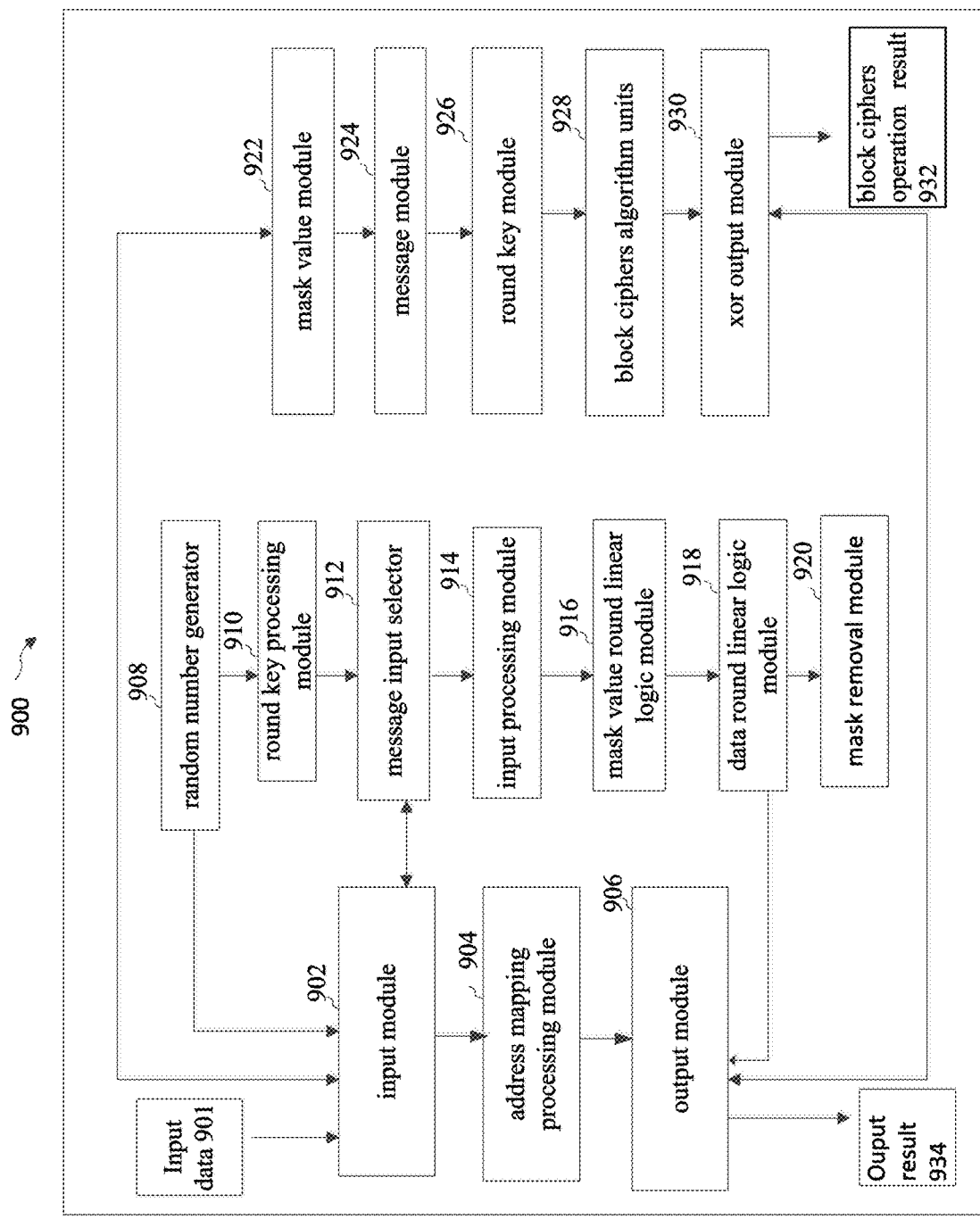
FIG. 9 is a conceptual data flow diagram illustrating the data flow between different means/components in an exemplary apparatus.

FIG. 9 is a conceptual data flow diagram illustrating the data flow between different means/components in an exemplary apparatus. The apparatus includes input module 902, address mapping processing module 904, output module 906, random number generator 908, round key processing module 910, message input selector 912, input processing module 914, a mask value round linear logic module 916, data round linear logic module 918, mask removal module 920, mask value module 922, message module 924, round key module 926, block ciphers algorithm units 928 and xor output module 930. The apparatus may include additional components that perform each of the blocks of the algorithm in the aforementioned FIG. 3. As such, each block in FIG. 3 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Input module 902 receives a random number and an input data 901 that is masked by the random number, and uses the random number and the input data as two inputs of the mask S-box.

Address mapping processing module 904 performs one-to-one mapping on the two inputs and corresponding memory address of the S-box, and the content stored in the corresponding memory address of the mask S-box is a result obtained by using the linearly converted random number to mask an output data of an original S-box.

Output module 906 linearly processes the random number by using a linear function, so as to obtain the linearly converted random number, and then use the linearly converted random number as one output 934 of the mask S-box, the content stored in the corresponding memory address is used as the other output of the mask S-box. The linear function consists of at least one linear operation selected from cyclic left shift, cyclic right shift, and xor.

Random number generator 908 generates a random number required for each operation. The random number is used as one input of a mask S-box.

Round key processing module 910 uses the random number of the current round to mask an original key to generate a mask key during a beginning round, and use the mask value outputted from the last round of iterative operation and the random number of the current round to mask the original key to generate a mask key during an iterative round.

Message input selector 912 selects the original input data and output the original input data during the beginning round, and select the output data which is outputted from the last round of iterative operation as an input data and output the input data during the iterative round.

Input processing module 914 performs a round key xor operation on the data which is outputted from the message input selector by using the mask key, and then use the round key xor operation result as the other input of the mask S-box. The mask S-box configured to receive the two inputs and perform the S-box lookup process, and output the linearly converted random number and the output data.

Mask value round linear logic module 916 uses a mask value round linear function to process the linearly processed random number, which is outputted from the mask S-box, and provide the processed random value by the function for next iterative operation when the iterative operation is not completed.

Data round linear logic module 918 uses a data round linear function to process the output data of the mask S-box, and provide the processed output data as an input data of the next iterative operation when the iterative operation is not completed, and output the processed data as an output data of the block ciphers algorithm unit directly after the iterative operation is completed.

Mask removal module 920 uses, after the iterative operation is completed, the output data of the block ciphers algorithm unit to xor the linearly processed random number outputted from the mask value round linear logic module, so as to obtain a mask-removed calculation result.

Mask value module 922 contains a mask value set R0, R1, . . . , Rn composed of n+1 random numbers, the mask subparts satisfied: $R0 \oplus R1 \oplus \ldots \oplus Rn = 0$, in which n is a natural number which is larger than or equal to 0.

Message module 924 divides a message X into n+1 message subparts to form a message set X0, X1, . . . , Xn, the message subparts satisfied: $X0 \oplus X1 \oplus \ldots \oplus Xn = X$.

Round key module 926 divides a round key RK into n+1 round key subparts to form a round key set RK0, RK1, . . . , $RK_n$, the round key subparts satisfied: $RK0 \oplus RK1 \oplus \ldots \oplus RKn = RK$.

N+1 block ciphers algorithm units 928 receive the n+1 mask subparts and use the n+1 mask subparts as input random numbers of the n+1 block ciphers algorithm units respectively; receive the n+1 message subparts and use the n+1 message subparts as original input data of the n+1 block ciphers algorithm units respectively in the 0th round of operation; and receive the n+1 round key subparts and use the n+1 round key subparts as original keys of the n+1 block ciphers algorithm units.

Xor output module 930 xors the outputs of the n+1 block ciphers algorithm units to obtain a block ciphers operation result 932 of the message X.

Figure 10:
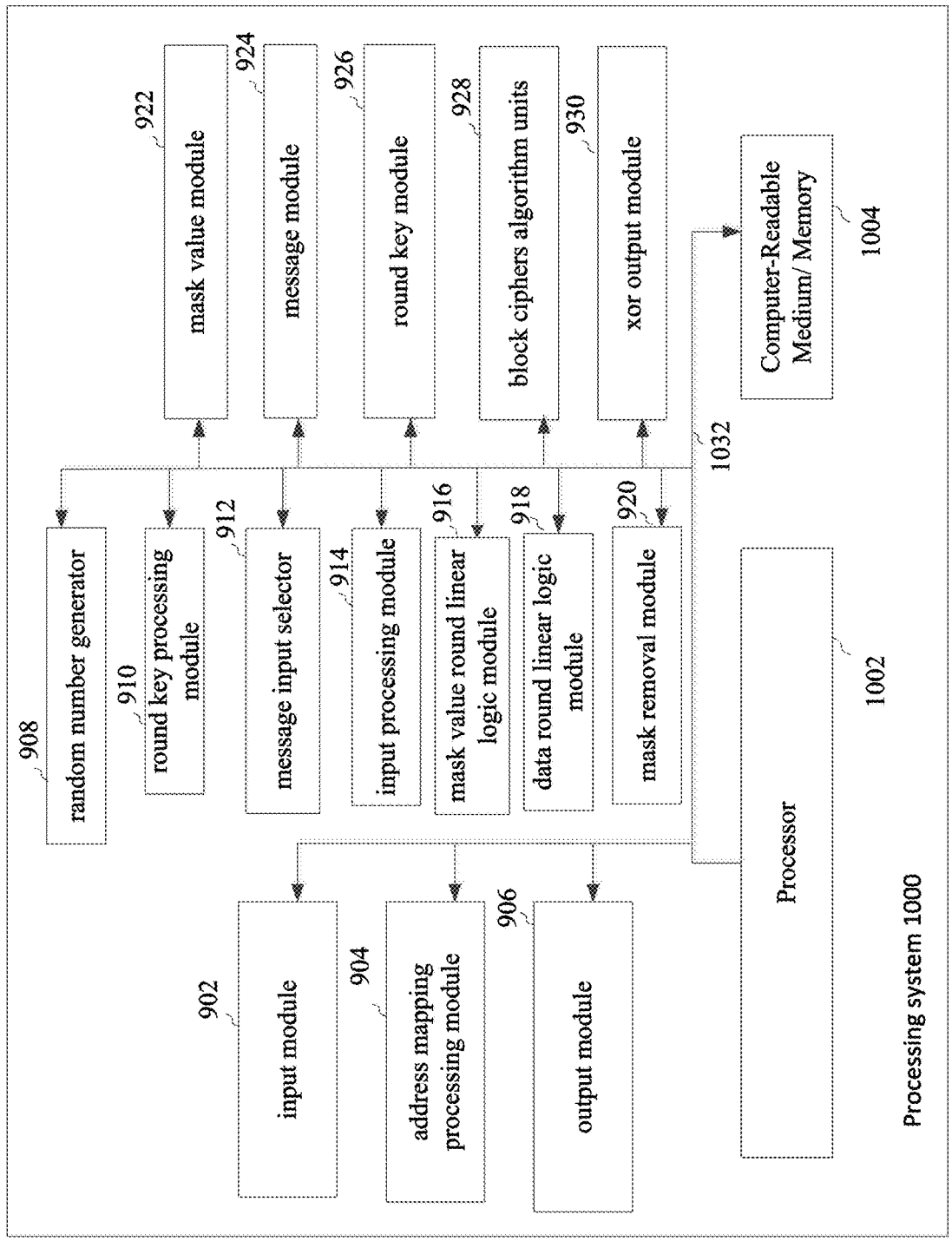
FIG. 10 is a diagram illustrating an example of a hardware implementation for an apparatus employing a processing system.

FIG. 10 is a diagram illustrating an example of a hardware implementation for an encryption device employing a processing system 1000. The processing system 1000 may be implemented with a bus architecture, represented generally by the bus 1032. The bus 1032 may include any number of interconnecting buses and bridges depending on the specific application of the processing system 1000 and the overall design constraints. The bus 1032 links together various circuits including one or more processors and/or hardware components, represented by the processor 1002, the components input module 902, address mapping processing module 904, output module 906, random number generator 908, round key processing module 910, message input selector 912, input processing module 914, a mask value round linear logic module 916, data round linear logic module 918, mask removal module 920, mask value module 922, message module 924, round key module 926, block ciphers algorithm units 928 and xor output module 930, and the computer-readable medium/memory 1004. The bus 1032 may also link various other circuits such as timing sources, peripherals, voltage regulators, and power management circuits, which are well known in the art, and therefore, will not be described any further.

The processing system 1000 includes a processor 1002 coupled to a computer-readable medium/memory 1004. The processor 1002 is responsible for general processing, including the execution of software stored on the computer-readable medium/memory 1004. The software, when executed by the processor 1002, causes the processing system 1000 to perform the various functions described supra for any particular apparatus. The computer-readable medium/memory 1004 may also be used for storing data that is manipulated by the processor 1002 when executing software. The processing system 1000 further includes at least one of the components, as described above. The components may be software components running in the processor 1002, resident/stored in the computer readable medium/memory 1004, one or more hardware components coupled to the processor 1002, or some combination thereof.

It needs to be finally noted that the masking involved in the present disclosure refers to performing XOR processing on data to be masked and the mask value.

The above specific embodiments are merely illustrative of the structure of the present disclosure, and various modifications and variations can be made by those common skilled in the art under the concept of the present disclosure, and should be included within the scope of the present disclosure.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for constructing an encryption device, comprising:
   using a random number to mask an original input data to obtain an input data, and then using the random number and the input data as inputs of a mask S-box;
   using the random number and the input data as the inputs of an address mapping function to obtain the corresponding memory address of the mask S-box, the address mapping function satisfies a one-one mapping condition, and the content stored in the corresponding memory address is an output data which is obtained by using the linearly converted random number to mask the original output data; and
   outputting the output data and the linearly converted random number after a lookup operation of the mask S-box.

2. The method for constructing the encryption device according to claim 1, further comprising:
   a 0th round operation step, including:
      using a random number generator to generate a random number required for the current round;
      using a message input selector to select the original input data as original input data of the current round;
      using the random number to mask an original key of current round to obtain the key of the current round;
      using the key of the current round to perform XOR processing with the original input data of the current round to obtain input data of the mask S-box in the current round;
      inputting the random number and the input data to the mask S-box, and performing a lookup operation of the mask S-box to obtain two outputs of the mask S-box;
      inputting the masked random number and the output data, which are outputted from the mask S-box, respectively to a mask value round linear function and a data round linear function to obtain two outputs for participating in next round of iterative operation; and
   an iterative operation step, including:
      using the random number generator to generate a random number required for current round;
      using the message input selector to select an output result of the data round linear function in the last round as an original input data of the current round;
      using the output result of the mask value round linear function in the last round and the random number to mask the original key of the current round to generate a masked key of the current round;
      using the key of current round to perform XOR processing with the original input data of the current round to obtain input data of the mask S-box in the current round;
      inputting the random number and the input data to the mask S-box, and performing a lookup operation of the mask S-box to obtain two outputs of the mask S-box;
      inputting the masked random number and the output data, which are outputted from the mask S-box, respectively to a mask value round linear function and a data round linear function to obtain two outputs for participating in next round of iterative operation; and
   repeating the iterative operation step till the iteration is completed.

3. The method for constructing the encryption device according to claim 2, wherein, after the iteration is completed, a result outputted from the data round linear function and the result outputted from the mask value round linear function in the final round of iterative operation are subject to XOR processing to obtain a final calculation result of the block ciphers algorithm.

4. The method for constructing the encryption device according to claim 2, further comprising:
   taking n+1 random numbers to form a mask value set $R_0$, $R_1, \ldots, R_n$, the mask subparts satisfied: $R_0 \oplus R_1 \oplus \ldots \oplus R_n = 0$, n is a natural number which is larger than or equal to 0;
   dividing a message X into n+1 message subparts to form a message set $X_0, X_1, \ldots, X_n$, the message subparts satisfied: $X_0 \oplus X_1 \oplus \ldots \oplus X_n = X$;
   dividing a round key RK into n+1 round key subparts to form a round key set $RK_0, RK_1, \ldots, RK_n$, the round key subparts satisfied: $RK_0 \oplus RK_1 \oplus \ldots \oplus RK_n = RK$;
   taking the n+1 mask subparts as input random numbers of the n+1 block ciphers algorithm units, respectively;

taking the n+1 message subparts as original input data of the n+1 block ciphers algorithm units in the 0th round of operation, respectively;

taking the n+1 round key subparts as original keys of the n+1 block ciphers algorithm units, respectively;

performing an iterative operation on each block ciphers algorithm unit till the iterative operation is completed; and performing an xor operation on the output results of the block ciphers algorithm units to obtain a final result.

5. An encryption device, comprising:

an input module configured to receive a random number and an input data which is masked by the random number, and use the random number and the input data as two inputs of the mask S-box;

an address mapping processing module configured to perform one-to-one mapping on the two inputs and corresponding memory address of the S-box, wherein the content stored in the corresponding memory address of the mask S-box is a result obtained by using the linearly converted random number to mask an output data of an original S-box;

an output module configured to linearly process the random number by using a linear function, so as to obtain the linearly converted random number, and then use the linearly converted random number as one output of the mask S-box, the content stored in the corresponding memory address is used as the other output of the mask S-box.

6. The encryption device according to claim 5, wherein the linear function consists of at least one linear operation selected from cyclic left shift, cyclic right shift, and xor.

7. The encryption device according to claim 5, further comprising:

a random number generator configured to generate a random number required for each operation, wherein the random number is used as one input of a mask S-box;

a round key processing module configured to use the random number of the current round to mask an original key to generate a mask key during a beginning round, and use the mask value outputted from the last round of iterative operation and the random number of the current round to mask the original key to generate a mask key during an iterative round;

a message input selector configured to select the original input data and output the original input data during the beginning round, and select the output data which is outputted from the last round of iterative operation as an input data and output the input data during the iterative round;

an input processing module configured to perform a round key xor operation on the data which is outputted from the message input selector by using the mask key, and then use the round key xor operation result as the other input of the mask S-box, wherein the mask S-box configured to receive the two inputs and perform the S-box lookup process, and output the linearly converted random number and the output data;

a mask value round linear logic module configured to use a mask value round linear function to process the linearly processed random number which is outputted from the mask S-box, and provide the processed random value by the function for next iterative operation when the iterative operation is not completed; and a data round linear logic module configured to use a data round linear function to process the output data of the mask S-box, and provide the processed output data as an input data of the next iterative operation when the iterative operation is not completed, and output the processed data as an output data of the block ciphers algorithm unit directly after the iterative operation is completed.

8. The encryption device according to claim 7, wherein a mask removal module is configured to, after the iterative operation is completed, use the output data of the block ciphers algorithm unit to xor the linearly processed random number outputted from the mask value round linear logic module, so as to obtain a mask-removed calculation result.

9. The encryption device according to claim 7, further comprising:

a mask value module that contains a mask value set $R_0, R_1, \ldots, R_n$ composed of n+1 random numbers, the mask subparts satisfied: $R_0 \oplus R_1 \oplus \ldots \oplus R_n = 0$, in which n is a natural number which is larger than or equal to 0;

a message module configured to divide a message X into n+1 message subparts to form a message set $X_0, X_1, \ldots, X_n$, the message subparts satisfied: $X_0 \oplus X_1 \oplus \ldots \oplus X_n = X$;

a round key module configured to divide a round key RK into n+1 round key subparts to form a round key set $RK_0, RK_1, \ldots, RK_n$, the round key subparts satisfied: $RK_0 \oplus RK_1 \oplus \ldots \oplus RK_n = RK$;

n+1 block ciphers algorithm units configured to receive the n+1 mask subparts and use the n+1 mask subparts as input random numbers of the n+1 block ciphers algorithm units respectively; receive the n+1 message subparts and use the n+1 message subparts as original input data of the n+1 block ciphers algorithm units respectively in the 0th round of operation; and receive the n+1 round key subparts and use the n+1 round key subparts as original keys of the n+1 block ciphers algorithm units; and an xor output module configured to xor the outputs of the n+1 block ciphers algorithm units to obtain a block ciphers operation result of the message X.

* * * * *